(12) United States Patent
Peltz

(10) Patent No.: US 9,581,763 B2
(45) Date of Patent: Feb. 28, 2017

(54) METHOD FOR FABRICATING AN OPTICAL DEVICE USING A TREATED SURFACE

(71) Applicant: The Boeing Company, Chicago, IL (US)

(72) Inventor: Leora Peltz, Pasadena, CA (US)

(73) Assignee: THE BOEING COMPANY, Chicago, IL (US)

(*) Notice: Subject to any disclaimer, the term of this patent is extended or adjusted under 35 U.S.C. 154(b) by 16 days.

(21) Appl. No.: 14/278,158

(22) Filed: May 15, 2014

(65) Prior Publication Data
US 2015/0331186 A1 Nov. 19, 2015

(51) Int. Cl.
G02B 6/12 (2006.01)
G02B 6/138 (2006.01)
G02B 6/13 (2006.01)
B05D 5/06 (2006.01)
B05D 3/00 (2006.01)
G02B 6/02 (2006.01)
G02B 6/122 (2006.01)
B33Y 10/00 (2015.01)
B33Y 40/00 (2015.01)
B33Y 80/00 (2015.01)

(52) U.S. Cl.
CPC ............ G02B 6/138 (2013.01); B05D 3/002 (2013.01); B05D 5/06 (2013.01); G02B 6/02295 (2013.01); G02B 6/1221 (2013.01); G02B 6/1225 (2013.01); G02B 6/13 (2013.01); B33Y 10/00 (2014.12); B33Y 40/00 (2014.12); B33Y 80/00 (2014.12)

(58) Field of Classification Search
CPC .... G02B 6/13; G02B 6/1225; G02B 6/02295; B05D 5/06

USPC .......................................... 65/37, 39; 385/14
See application file for complete search history.

(56) References Cited

U.S. PATENT DOCUMENTS 4,366,490 A * 12/1982 DeBonte .............. B41J 2/04581
347/68
5,738,798 A * 4/1998 Leonard ................. G02B 6/305
216/24
7,077,334 B2 * 7/2006 Sachs ..................... B41J 2/1429
239/11
7,938,341 B2 5/2011 King et al.
(Continued)

FOREIGN PATENT DOCUMENTS

WO 2004091911 A2 10/2004
WO 2012078820 A2 6/2012

OTHER PUBLICATIONS

"Areosol Jet Technology," Optomec, copyright 2006, 2 pages, accessed May 14, 2014. http://www.optomec.com/Additive-Manufacturing-Technology/Printed-Electronics.

Primary Examiner — Kaveh C Kianni
Assistant Examiner — Hung Lam
(74) Attorney, Agent, or Firm — Yee & Associates, P.C.

(57) ABSTRACT

A method and apparatus for forming an optical device on a substrate. A surface of the substrate may be treated to form a treated surface having a number of modified properties. A plurality of drops of material may be deposited onto the treated surface of the substrate to form the optical device. An adhesion between the plurality of drops and the treated surface of the substrate may be reduced by the number of modified properties of the treated surface such that the plurality of drops form an optical device having a lateral resolution below a selected threshold.

23 Claims, 9 Drawing Sheets

(56) References Cited

U.S. PATENT DOCUMENTS

| | | | |
|---|---|---|---|
| 2006/0121285 A1* | 6/2006 | Nakayama | G02F 1/0121 |
| | | | 428/411.1 |
| 2008/0054508 A1* | 3/2008 | Rudmann | B29C 43/021 |
| | | | 264/2.7 |
| 2009/0081376 A1* | 3/2009 | Ito | C08F 283/06 |
| | | | 427/487 |
| 2011/0207049 A1* | 8/2011 | Tillema | C07F 7/184 |
| | | | 430/270.1 |

* cited by examiner

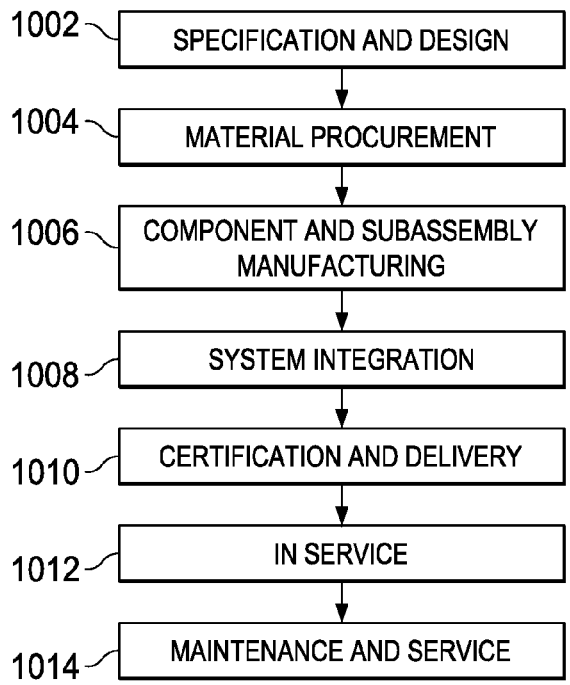
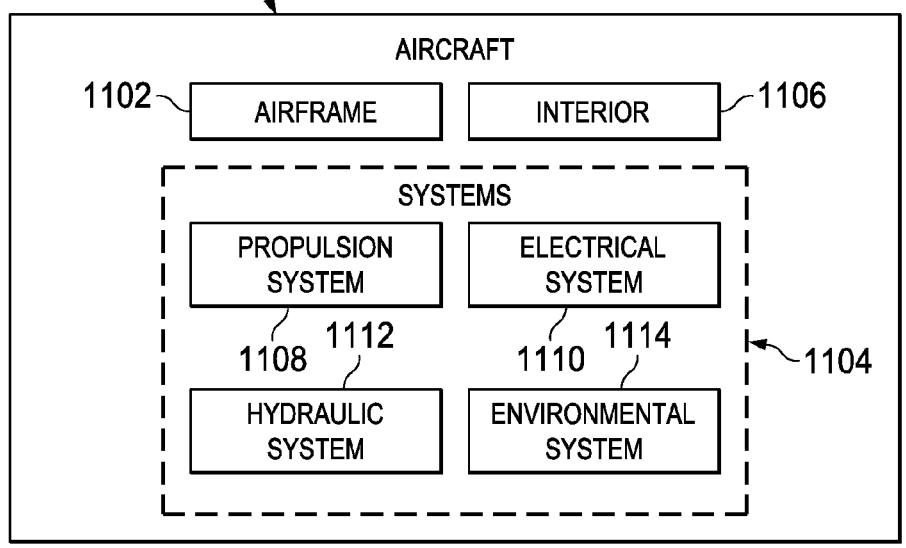

METHOD FOR FABRICATING AN OPTICAL DEVICE USING A TREATED SURFACE

BACKGROUND INFORMATION

1. Field

The present disclosure relates generally to additive manufacturing and, in particular, to forming an optical device using additive manufacturing. Still more particularly, the present disclosure relates to a method and apparatus for forming an optical device having a lateral resolution below a selected threshold using additive manufacturing and a substrate having a treated surface.

2. Background

Additive manufacturing is becoming more frequently employed in various industries, including, but not limited to, the construction industry, the aerospace industry, the automotive industry, the biotech industry, and other types of industries. As used herein, "additive manufacturing" is the process of making a three-dimensional solid object by laying down drops of material to form one or more successive layers of material in different shapes based on a digital model of the solid object and under computer control. The most common form of additive manufacturing is three-dimensional (3D) printing.

Using three-dimensional printing to manufacture an object, such as a part for an aircraft, instead of traditional manufacturing techniques, may reduce the overall amount of time, effort, and expense related to manufacturing the part. However, in some cases, three-dimensional printing may be unable to achieve the desired level of fineness with respect to the lateral resolution needed for certain types of parts. As used herein, the "lateral resolution" of an object is the smallest linear separable and measurable feature of the object. The smaller the level of lateral resolution that is achievable by a three-dimensional printing process, the finer the features of the part than can be manufactured.

However, some currently available manufacturing processes that use three-dimensional printing may only be able to create features having lateral resolution of about 10 micrometers (μm) or larger. Certain types of parts may require finer features having a lateral resolution below, for example, without limitation, about 5 micrometers (μm). For example, without limitation, some types of optical waveguides, optical resonators, optical switchers, and other optical devices may require features having a lateral resolution of between about 1 micrometer and about 3 micrometers.

One solution may be to use three-dimensional printing to create larger optical devices having a larger resolution. However, these types of optical devices may be multi-mode and may have a lower level of performance than desired. Another solution may be to use one or more fibers having a diameter sufficiently small to achieve the desired level of lateral resolution, instead of three-dimensional printing, to form an optical device. However, using fiber may limit the shapes of optical devices that can be created and may be more difficult than desired. Therefore, it would be desirable to have a method and apparatus that take into account at least some of the issues discussed above, as well as other possible issues.

SUMMARY

In one illustrative embodiment, a method for forming an optical device on a substrate may be provided. A surface of the substrate may be treated to form a treated surface having a number of modified properties. A plurality of drops of material may be deposited onto the treated surface of the substrate to form the optical device. An adhesion between the plurality of drops and the treated surface of the substrate may be reduced by the number of modified properties of the treated surface such that the plurality of drops form an optical device having a lateral resolution below a selected threshold.

In another illustrative embodiment, a method for forming an optical device may be provided. A portion of a surface may be treated to form a treated surface. A plurality of drops of a material may be deposited onto the treated surface to form the optical device. Flattening of the plurality of drops deposited on the treated surface may be reduced.

In yet another illustrative embodiment, a method for forming an optical device having a lateral resolution below a selected threshold may be provided. A surface of a substrate may be treated at least one of mechanically, thermally, or chemically to form a treated surface having a number of modified properties in which the number of modified properties includes at least one of a roughened texture or a reduced wettability. A plurality of drops of the material may be deposited onto the treated surface of the substrate to form the optical device. An adhesion between the plurality of drops and the treated surface of the substrate may be reduced by the number of modified properties of the treated surface. The optical device formed by the plurality of drops may have a lateral resolution below a selected threshold. A drop in the plurality of drops may have a shape that is more rounded than flattened, a width that is less than two times a height of the drop, and a contact angle between the drop and the treated surface that is greater than about 90 degrees. A coating may be applied over the plurality of drops of the material and at least a portion of the treated surface of the substrate to secure the optical device formed by the plurality of drops to the treated surface.

In another illustrative embodiment, an apparatus may comprise a substrate and an optical device. The substrate may have a treated surface with a number of modified properties configured to reduce adhesion between the treated surface and a plurality of drops deposited onto the treated surface. The optical device may be formed by the plurality of drops deposited on the substrate. The optical device may have a lateral resolution below a selected threshold.

In still another illustrative embodiment, a platform may comprise a treated surface, an optical device, and a coating. The treated surface may have a number of modified properties configured to reduce adhesion between the treated surface and a drop of material deposited onto the treated surface. The optical device may be formed by a plurality of drops deposited onto treated surface. Each drop in the plurality of drops may have a shape, a width, and a contact angle based on a reduced adhesion between the each drop and the treated surface such that the optical device formed by the plurality of drops has a lateral resolution below a selected threshold. The shape of the drop may be more rounded than flattened, the width of the drop may be less than two times a height of the drop, and the contact angle between the drop and the treated surface may be greater than about 90 degrees. The coating may be applied over the optical device and at least a portion of the treated surface. The coating may secure the optical device to the treated surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 10 is an illustration of an aircraft manufacturing and service method in the form of a block diagram in accordance with an illustrative embodiment; and FIG. 11 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a method and apparatus for creating an object having features with a lateral resolution below a selected threshold such that the features of the object have a desired level of fineness. The selected threshold may be, for example, without limitation, a resolution below about 8 micrometers.

In particular, the illustrative embodiments recognize and take into account that it may be desirable to reduce the flattening of drops that are deposited onto a substrate by an additive manufacturing system to form an object. Reducing the flattening of these drops may reduce the widths of the drops. The illustrative embodiments recognize and take into account that reducing the widths of the drops deposited onto the substrate may allow finer features to be formed for the object. In particular, reducing the widths of the drops may allow the lateral resolution of the features formed for the object to be reduced below the selected threshold.

The illustrative embodiments recognize and take into account that being able to reduce the lateral resolution of the features formed for an object to below the selected threshold may allow objects such as, for example, without limitation, single-mode waveguides to be formed. Further, the more rounded shapes of the drops may allow corrugated waveguides to be formed on both planar and non-planar surfaces.

Thus, the illustrative embodiments provide a method and apparatus for creating an object having a lateral resolution below a selected threshold using an additive manufacturing system and a treated surface. In one illustrative example, a surface of a substrate may be treated to form a treated surface having a number of modified properties. A plurality of drops of material may be deposited onto the treated surface of the substrate. Adhesion between the plurality of drops and the treated surface of the substrate may be reduced by the number of modified properties of the treated surface such that the plurality of drops form an object having a lateral resolution below a selected threshold.

Figure 1:
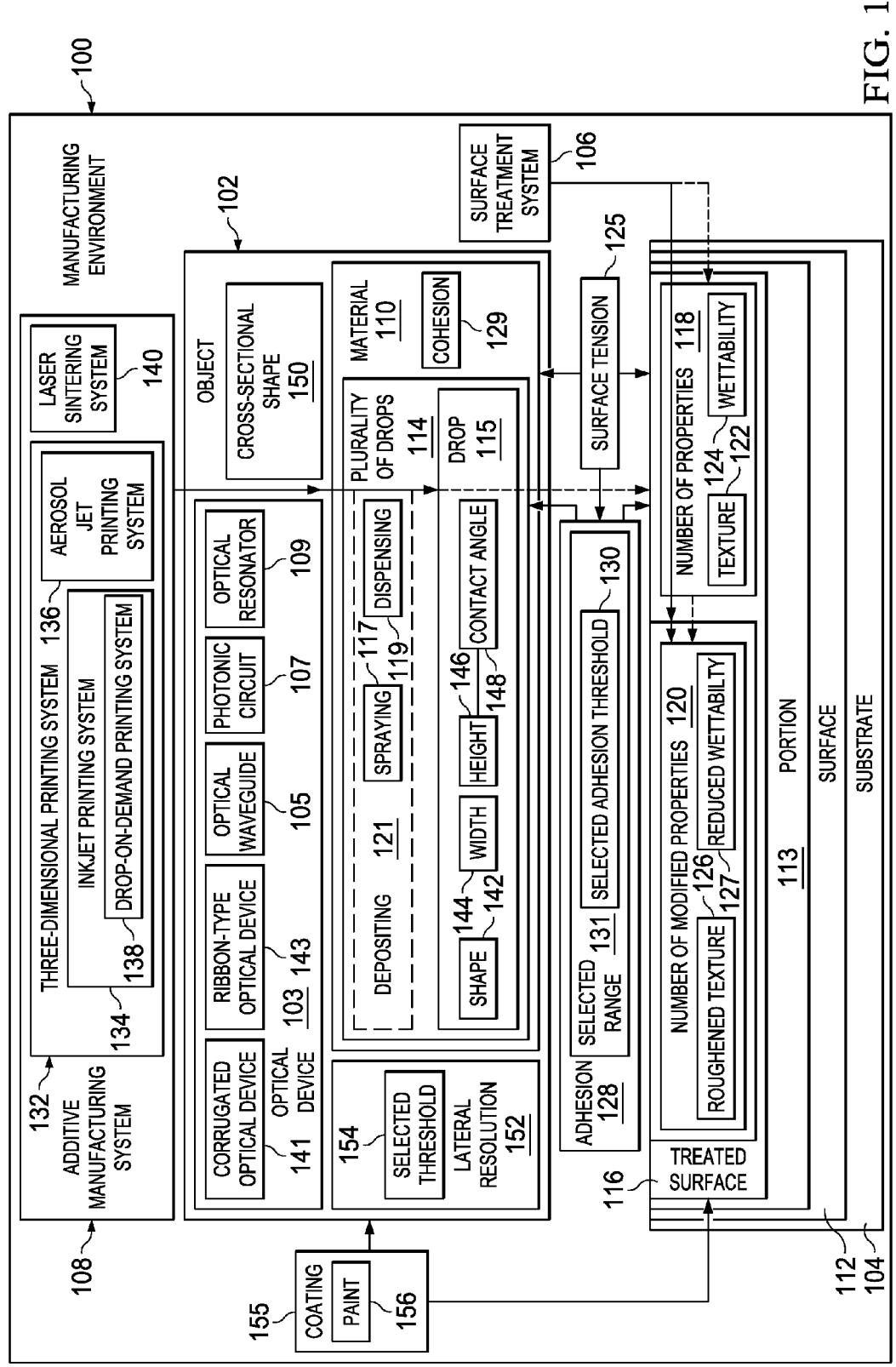
FIG. 1 is an illustration of a manufacturing environment in the form of a block diagram in which an illustrative embodiment may be implemented.

With reference now to the figures, and in particular, with reference to FIG. 1, an illustration of a manufacturing environment in the form of a block diagram is depicted in accordance with an illustrative embodiment. In FIG. 1, manufacturing environment 100 is an example of one implementation of an environment in which object 102 may be formed.

Object 102 may take any of a number of different forms, depending on the implementation. In this illustrative example, object 102 may take the form of optical device 103. Optical device 103 may take the form of optical waveguide 105, photonic circuit 107, optical resonator 109, or some other type of optical device or structure, depending on the implementation.

As depicted, manufacturing environment 100 may include substrate 104, surface treatment system 106, and additive manufacturing system 108. Substrate 104 may be any structure onto which material 110 may be deposited to form object 102. Substrate 104 may be selected based on the optical properties of substrate 104. Substrate 104 may be selected to substantially prevent or reduce undesired optical signal loss from optical device 103 that is formed on substrate 104 to the surroundings of substrate 104 and optical device 103.

Material 110 may be comprised of, for example, without limitation, at least one of a siloxane polymer material, a poly(methyl methacrylate) material, or some other type of thermoset polymer. In some illustrative examples, material 110 may be comprised of at least one of polyurethane, polyimide, or some other type of polymer.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Material 110 may be placed onto surface 112 of substrate 104 by depositing 121 material 110 onto surface 112.

Depositing 121 of material 110 onto surface 112 may be performed in a number of different ways. In one illustrative example, material 110 may be deposited onto surface 112 through spraying 117 of material 110 onto surface 112 in the form of plurality of drops 114. In another illustrative example, material 110 may be deposited onto surface 112 by dispensing 119 one material 110, one drop 115 of material 110 at a time.

As depicted, material 110 may be selected such that object 102 formed from material 110 functions in a desired manner. For example, without limitation, material 110 may be selected to have at least one of certain optical properties, electrical properties, conductive properties, or other types of properties such that object 102 formed from material 110 functions in a desired manner.

As one illustrative example, material 110 may be selected to have certain optical properties such that optical waveguide 105 formed from material 110 functions in a desired manner. In some cases, material 110 may have at least one property that allows material 110 to be sprayed or deposited onto surface 112 of substrate 104 in a desired manner.

Surface treatment system 106 may be configured to treat surface 112 of substrate 104 to form treated surface 116 prior to material 110 being added onto substrate 104. In particular, portion 113 of surface 112 may be treated to form treated surface 116. In this manner, only portion 113 of surface 112 may be functionalized for forming optical device 103. Examples of different implementations for surface treatment system 106 are described in FIG. 2 below.

Treating surface 112 may include modifying number of properties 118 of surface 112 such that treated surface 116 is formed having number of modified properties 120. As used herein, a "number of" items may include one or more items. In this manner, number of properties 118 may include one or more properties.

In this illustrative example, number of properties 118 may include at least one of texture 122, wettability 124, or some other type of property. Surface 112 may be treated such that number of properties 118 is modified to form number of modified properties 120, which may include at least one of roughened texture 126, reduced wettability 127, or some other modified property.

Number of modified properties 120 may be selected to modify surface tension 125 between material 110 and treated surface 116 to reduce adhesion 128 between plurality of drops 114 of material 110 and treated surface 116. In other words, number of modified properties 120 may reduce adhesion 128 between plurality of drops 114 of material 110 and treated surface 116 to below selected adhesion threshold 130.

Adhesion 128 may be the attraction between treated surface 116 and plurality of drops 114 that causes plurality of drops 114 to cling to treated surface 116. Number of modified properties 120 may adjust the adhesive forces between plurality of drops 114 and treated surface 116 to reduce adhesion 128 between treated surface 116 and plurality of drops 114. Treated surface 116 with number of modified properties 120 may exert weaker adhesive forces on plurality of drops 114 than surface 112 with number of properties 118. When adhesion 128 is greater than desired, plurality of drops 114 may cling to treated surface 116, which may in turn cause plurality of drops 114 to flatten.

Selected adhesion threshold 130 may be selected sufficiently low such that plurality of drops 114 are not flattened more than desired. Further, selected adhesion threshold 130 may be selected such that adhesion 128 is less than cohesion 129 of material 110. Cohesion 129 may be the attraction of the molecules of material 110 to each other. Cohesion 129 may be an inherent property of material 110.

In this manner, selected adhesion threshold 130 is selected such that the flattening of plurality of drops 114 that occurs when plurality of drops 114 are deposited onto treated surface 116 is reduced. Number of modified properties 120 may be considered as causing treated surface 116 to "repel" plurality of drops 114 such that plurality of drops 114 are not flattened.

Surface treatment system 106 may ensure that adhesion 128 of plurality of drops 114 to treated surface 116 is reduced sufficiently to reduce undesired flattening of plurality of drops 114 but still high enough to ensure that plurality of drops 114 do not move or roll around on treated surface 116 in an undesired manner. In other words, treated surface 116 in FIG. 1 may be formed by surface treatment system 106 in a manner that ensures that adhesion 128 is within selected range 131. Selected adhesion threshold 130 may be the minimum threshold of selected range 131.

Once surface 112 of substrate 104 has been treated by surface treatment system 106 to form treated surface 116, additive manufacturing system 108 may be used to deposit material 110 onto treated surface 116 in the form of plurality of drops 114. In one illustrative example, additive manufacturing system 108 may take the form of three-dimensional (3D) printing system 132.

Three-dimensional printing system 132 may take the form of inkjet printing system 134, aerosol jet printing system 136, or some other type of printing system, depending on the implementation. In one illustrative example, inkjet printing system 134 may take the form of drop-on-demand printing system 138. Of course, in other illustrative examples, additive manufacturing system 108 may take some form other than three-dimensional printing system 132. For example, without limitation, additive manufacturing system 108 may take the form of laser sintering system 140.

Adhesion 128 between treated surface 116 and plurality of drops 114 deposited onto treated surface 116 may be reduced because of number of modified properties 120 of treated surface 116 such that each of plurality of drops 114 has more of a spherical shape rather than a flattened shape. In other words, each of plurality of drops 114 may have more of a rounded shape than a flattened shape.

Drop 115 may be an example of one of plurality of drops 114. Drop 115 may have shape 142, width 144, height 146, and contact angle 148. Width 144 and height 146 of drop 115 may contribute to shape 142 of drop 115. Contact angle 148 may be the angle at which the interface between drop 115 and the air around drop 115 meets the interface between drop 115 and treated surface 116. In other words, contact angle 148 may be the angle formed between the solid-liquid interface and the liquid-vapor interface formed by drop 115.

When drop 115 flattens more than desired, shape 142 may take the form of or resemble an oblate spheroid. In this illustrative example, drop 115 may be considered flattened more than desired when width 144 of drop 115 is equal to or more than two times height 146 of drop 115.

Cohesion 129 of material 110 may also affect at least one of shape 142, width 144, height 146, and contact angle 148 of drop 115. Cohesion 129 may affect the shape of object 102 formed using drop 115. A greater cohesion 129 may cause plurality of drops 114 to cling together more such that the top surface of object 102 formed using drop 115 is closer to being substantially planar as compared to a lesser cohesion 129 that may cause plurality of drops 114 to not cling together as tightly such that the top surface of object 102 is wavier. In particular, a lesser cohesion 129 may cause object 102 to be more corrugated.

In this manner, material 110 may be selected such that material 110 has cohesion 129 that causes optical device 103 formed on treated surface 116 to be one of corrugated optical device 141 and ribbon-type optical device 143. Corrugated optical device 141 may have a corrugated top surface. In other words, corrugated optical device 141 may be wavy or have ridges and grooves. Ribbon-type optical device 143 may have a top surface that is closer to being substantially planar. In other words, ribbon-type optical device 143 may be less wavy and may have less prominent, if any, ridges or grooves.

Number of modified properties 120 of treated surface 116 may cause drop 115 to have shape 142 that is less spheroid. In other words, number of modified properties 120 may result in the flattening of drop 115 being reduced such that shape 142 is more rounded than flattened. In this illustrative example, drop 115 may be considered more rounded than flattened when width 144 of drop 115 is less than two times height 146 of drop 115.

Further, number of modified properties 120 of treated surface 116 may result in contact angle 148 being greater than about 90 degrees due to reduced adhesion 128. Thus, when drop 115 is more rounded than flattened, contact angle 148 may be greater than about 90 degrees.

Once plurality of drops 114 have been deposited on treated surface 116, object 102 is formed. Object 102 may have desired cross-sectional shape 150. Desired cross-sectional shape 150 may be a shape that is substantially rectangular, square, circular, or some other two-dimensional shape.

The reduction in the flattening of and width of each of plurality of drops 114 caused by reduced adhesion 128 due to number of modified properties 120 of treated surface 116 of substrate 104 allows lateral resolution 152 of object 102 formed by plurality of drops 114 to be reduced below selected threshold 154. Selected threshold 154 may be a resolution at or below about 8 micrometers. For example, without limitation, selected threshold 154 may be about 8 micrometers, about 6 micrometers, about 5 micrometers, about 2 micrometers, about 1 micrometer, or some other resolution below 8 micrometers. In this manner, object 102 may be formed having a selected lateral resolution 152 that is, for example, without limitation, about 8 micrometers or lower than about 8 micrometers.

This reduction in lateral resolution 152 allows finer features to be formed for object 102. As one illustrative example, optical waveguide 105 may be formed as a single-mode waveguide having a width, and thus lateral resolution, between about 1 micrometer and about 5 micrometers. The more spherical shape of each of plurality of drops 114 may also allow optical waveguide 105 to be formed as a corrugated waveguide on a planar or non-planar surface, depending on the implementation.

Coating 155 may then be applied over object 102 and at least a portion of treated surface 116 of substrate 104 to secure object 102 to substrate 104. Coating 155 may adhere to treated surface 116 to encapsulate object 102. In one illustrative example, the treating of portion 113 of surface 112 to form treated surface 116 may aid in coating 155 adhering to treated surface 116. Depending on the implementation, coating 155 may or may not actually adhere to plurality of drops 114 that form object 102.

Coating 155 may hold plurality of drops 114 that form object 102 in fixed positions on substrate 104. Coating 155 may encapsulate plurality of drops 114 such that plurality of drops 114 may be secured to substrate 104. In some cases, coating 155 may also be used to protect at least one of object 102 and substrate 104. For example, without limitation, coating 155 may be used to protect at least one of substrate 104 and object 102 from mechanical impact or external chemicals. In one illustrative example, coating 155 may take the form of paint 156.

Using additive manufacturing system 108 to perform depositing 121 of plurality of drops 114 of material 110 onto treated surface 116 may eliminate the need to use one or more additional items to secure object 102 formed by plurality of drops 114 to substrate 104. For example, without limitation, any combination of fasteners, adhesive materials, bonding materials, or other types of devices may not be needed. In this manner, by forming object 102 directly on substrate 104 using additive manufacturing system 108, and then securing object 102 to substrate 104 using coating 155, the overall weight of substrate 104 with object 102 may be reduced.

Further, the reduction in adhesion 128 between plurality of drops 114 and treated surface 116 causes each of plurality of drops 114 to have a more rounded shape. With this rounded shape, each of plurality of drops 114 may be taller as compared to when each of plurality of drops 114 has a flattened shape. In some cases, this increase in height of plurality of drops 114 may reduce or eliminate the need for adding a second layer of material 110, such as a second layer of drops, on top of plurality of drops 114 to form object 102 of a desired height and a desired width. Consequently, the amount of material 110 needed to form object 102 may be reduced.

Figure 2:
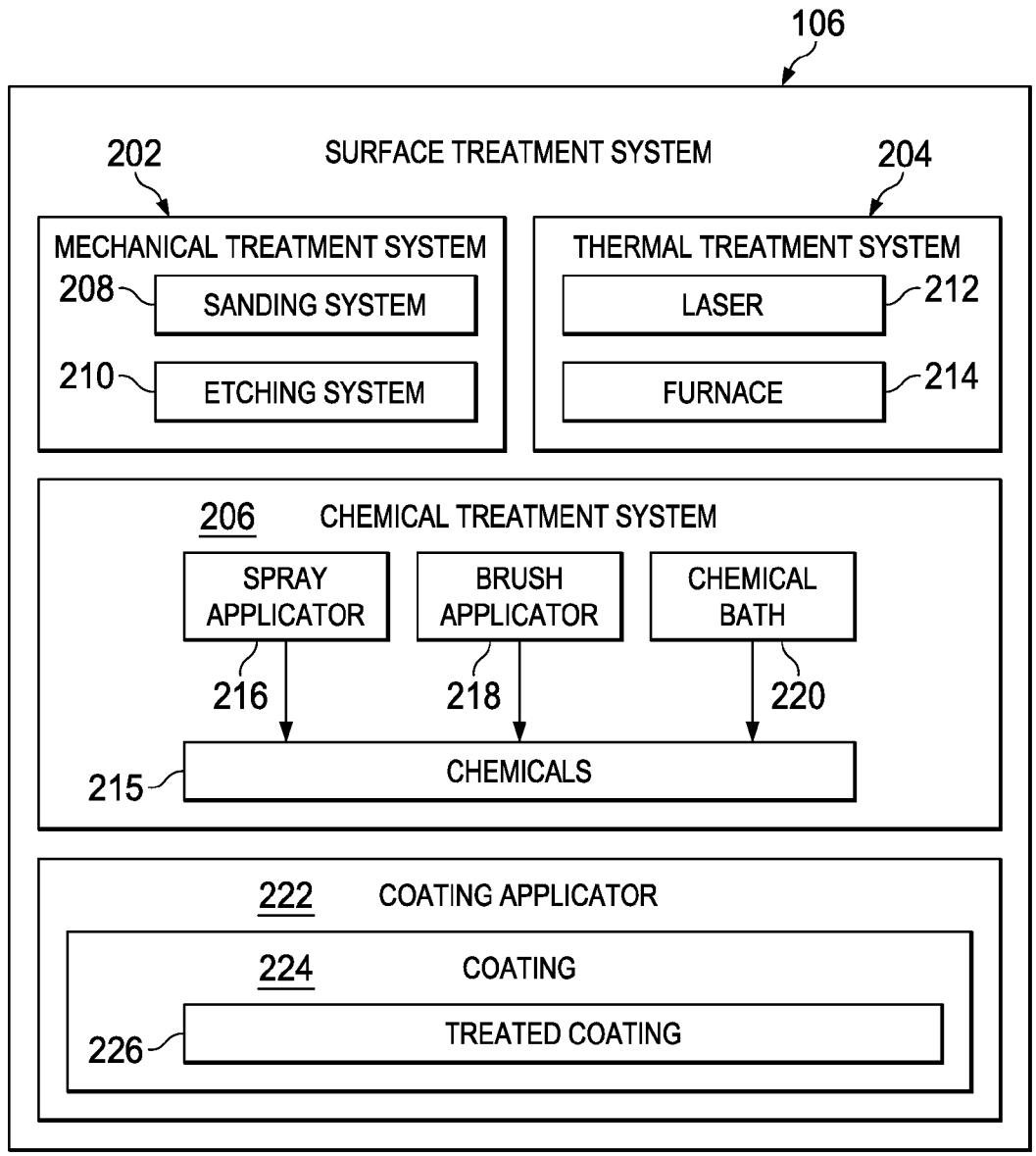
FIG. 2 is an illustration of a surface treatment system in the form of a block diagram in accordance with an illustrative embodiment.

With reference now to FIG. 2, an illustration of surface treatment system 106 from FIG. 1 is depicted in the form of a block diagram in accordance with an illustrative embodiment. As depicted, surface treatment system 106 may take a number of different forms. Depending on the implementation, surface treatment system 106 may include at least one of mechanical treatment system 202, thermal treatment system 204, or chemical treatment system 206.

In this illustrative example, mechanical treatment system 202 may be configured to modify at least one of number of properties 118 of surface 112 of substrate 104 in FIG. 1 to form at least one of number of modified properties 120. In one illustrative example, mechanical treatment system 202 may be configured to roughen surface 112 in FIG. 1 to change texture 122 into roughened texture 126. Mechanical treatment system 202 may include at least one of sanding system 208, etching system 210, or some other type of mechanical equipment.

As depicted, thermal treatment system 204 may be configured to modify at least one of number of properties 118 of surface 112 of substrate 104 in FIG. 1 to form at least one of number of modified properties 120. Depending on the implementation, thermal treatment system 204 may include at least one of laser 212, furnace 214, or some other type of thermal equipment.

In this illustrative example, chemical treatment system 206 may be configured to modify at least one of number of properties 118 of surface 112 of substrate 104 in FIG. 1 to form at least one of number of modified properties 120. Chemical treatment system 206 may include chemical equipment configured to apply number of chemicals 215 onto surface 112 to form treated surface 116 in FIG. 1. Chemical treatment system 206 may include at least one of spray applicator 216, brush applicator 218, chemical bath 220, or some other type of chemical equipment. In one illustrative example, chemical treatment system 206 may be used to perform chemical etching to form treated surface 116.

In some illustrative examples, surface treatment system 106 may take the form of coating applicator 222. Coating applicator 222 may take the form of any type of device or system configured to apply coating 224 onto surface 112 to form treated surface 116 in FIG. 1. Coating 224 may be comprised of any material configured to reduce surface tension 125 between treated surface 116 and plurality of drops 114 of material 110 in FIG. 1 such that adhesion 128 of plurality of drops 114 to treated surface 116 is reduced.

For example, in one illustrative example, coating 224 may take the form of treated coating 226. Treated coating 226 may be implemented by roughening, mechanically altering, chemically altering, or otherwise altering a coating prior to or after the coating has been applied to portion 113 of surface 112 in FIG. 1. Treated coating 226 may form treated surface 116 and may have number of modified properties 120 in FIG. 1 that cause reduced adhesion 128 between plurality of drops 114 in FIG. 1 and treated coating 226.

The illustrations of manufacturing environment 100 in FIG. 1 and surface treatment system 106 in FIGS. 1-2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in the examples described above, all of surface 112 may be treated by surface treatment system 106 to form treated surface 116. However, in other illustrative examples, only a portion of surface 112 may be treated to form treated surface 116. In some illustrative examples, object 102 may be a device other than optical device 103. For example, object 102 may take the form of a wire, a line, a conduit, or some other type of object.

In other illustrative examples, surface treatment system 106 may be considered part of additive manufacturing system 108. Further, in some cases, coating 155 may be applied using one or more devices in additive manufacturing system 108.

Figure 3:
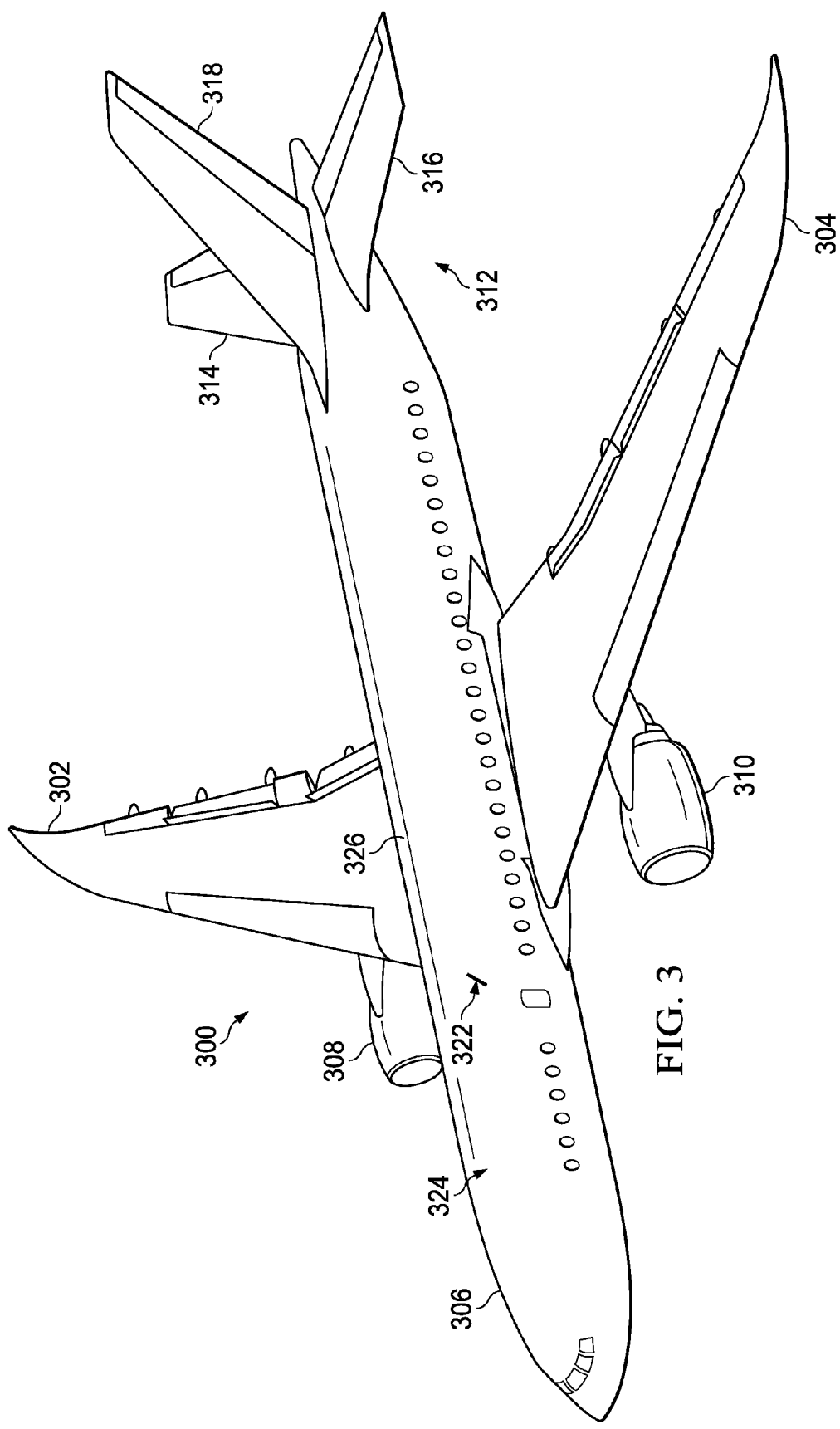
FIG. 3 is an illustration of an aircraft in accordance with an illustrative embodiment.

With reference now to FIG. 3, an illustration of an aircraft is depicted in accordance with an illustrative embodiment. In this illustrative example, aircraft 300 may have wing 302 and wing 304 attached to body 306. Aircraft 300 may include engine 308 attached to wing 302 and engine 310 attached to wing 304. Body 306 may have tail section 312. Horizontal stabilizer 314, horizontal stabilizer 316, and vertical stabilizer 318 may be attached to tail section 312 of body 306.

Aircraft 300 is an example of a platform that has a surface on which an object may be formed through additive manufacturing implemented in accordance with an illustrative embodiment. In this illustrative example, optical device 322 may be formed on composite skin 324 of body 306 of aircraft 300 using additive manufacturing. In other illustrative examples, body 306 may have some other type of skin such as, for example, without limitation, an aluminum skin, some other type of metal skin, or a skin made out of some other material. For example, without limitation, optical device 322 may have been formed using additive manufacturing system 108 in FIG. 1. Optical device 322 may be an example of one implementation for optical device 103 in FIG. 1.

Additive manufacturing system 108 may have deposited a plurality of drops (not shown), such as plurality of drops 114 in FIG. 1, onto composite skin 324 to form optical device 322. Composite skin 324 may be an example of one implementation for substrate 104 in FIG. 1.

In this illustrative example, composite skin 324 may have treated surface 326. Treated surface 326 may be an example of one implementation of treated surface 116 in FIG. 1. Treated surface 326 may be a surface of composite skin 324 that was treated, or modified, using, for example, without limitation, surface treatment system 106 in FIG. 1, prior to the plurality of drops being deposited onto composite skin 324.

Treated surface 326 may have a number of modified properties, similar to number of modified properties 120 in FIG. 1, configured such that adhesion between treated surface 326 and the plurality of drops (not shown) deposited onto treated surface 326 to form optical device 322 below a selected threshold. Treated surface 326 may have an increased repelling force capable of repelling the plurality of drops (not shown) deposited onto composite skin 324 to form optical device 322 such that the plurality of drops are not flattened more than desired. In this manner, treated surface 326 may have a finer lateral resolution for optical device 322.

By forming optical device 322 directly on composite skin 324 of aircraft 300 using additive manufacturing, the need to use one or more additional items to secure optical device 322 to composite skin 324 may be eliminated. These additional items may include, for example, without limitation, any combination of fasteners, adhesive materials, bonding materials, or other types of devices. In some cases, by forming optical device 322 directly on composite skin 324 of aircraft 300 using additive manufacturing, the amount of material used to form optical device 322 may be reduced. Thus, using additive manufacturing to form optical device 322 and secure optical device 322 to composite skin 324 may reduce the overall weight of aircraft 300 as compared to using traditional manufacturing techniques to manufacture optical device 322 and other items to secure optical device 322 to composite skin 324.

This illustration of aircraft 300 is provided for purposes of illustrating one environment in which the different illustrative embodiments may be implemented. The illustration of aircraft 300 in FIG. 3 is not meant to imply architectural limitations as to the manner in which different illustrative embodiments may be implemented. For example, aircraft 300 is shown as a commercial passenger aircraft. The different illustrative embodiments may be applied to other types of aircraft, such as private passenger aircraft, a rotorcraft, and other suitable type of aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

Figure 4:
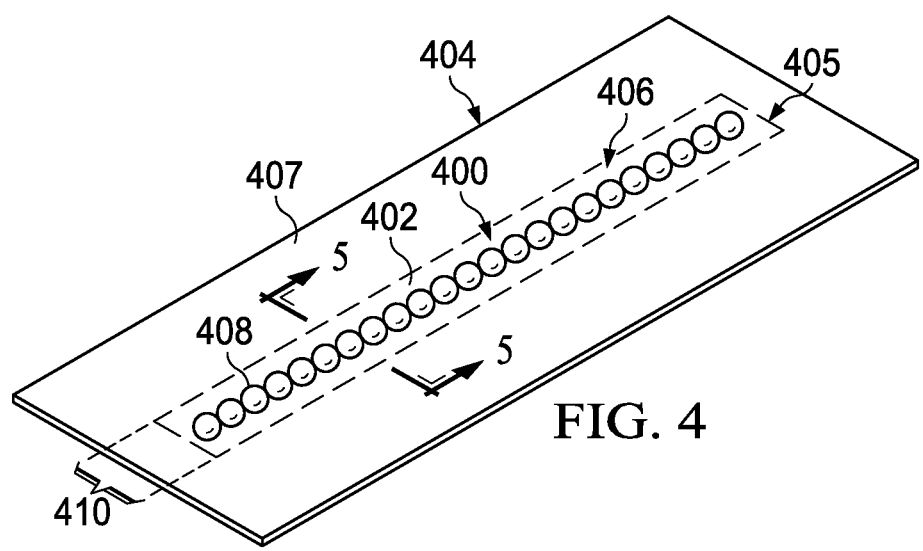
FIG. 4 is an illustration of an isometric view of a single-mode optical waveguide formed on a substrate in accordance with an illustrative embodiment.

Turning now to FIG. 4, an illustration of an isometric view of a single-mode optical waveguide formed on a substrate is depicted in accordance with an illustrative embodiment. In this illustrative example, plurality of drops 400 may be deposited onto treated surface 402 of substrate 404 to form single-mode waveguide 406. Plurality of drops 400, treated surface 402, substrate 404, and single-mode waveguide 406 may be examples of physical implementations for plurality of drops 114, treated surface 116, substrate 104, and optical waveguide 105, respectively, in FIG. 1.

Substrate 404 has surface 407 that is substantially planar. Portion 405 of surface 407 of substrate 404 may have been treated using, for example, without limitation, a surface treatment system such as surface treatment system 106 in FIG. 1 to form treated surface 402. Plurality of drops 400 may have been deposited onto treated surface 402 of substrate 404 using, for example, without limitation, an additive manufacturing system such as additive manufacturing system 108 in FIG. 1.

Treated surface 402 may have a number of modified properties, such as number of modified properties 120 in FIG. 1, that cause each of plurality of drops 400 formed on treated surface 402 to have more of a rounded shape than a flattened shape. In particular, portion 405 of surface 407 may have been at least one of mechanically, thermally, or chemically treated to reduce the adhesive forces between plurality of drops 400 and treated surface 402 such that plurality of drops 400 are not flattened more than desired.

Drop 408 is an example of one of plurality of drops 400. Drop 408 may be an example of one implementation for drop 115 in FIG. 1. Drop 408 may be more rounded than flattened. In this manner, single-mode waveguide 406 formed by plurality of drops 400 may have lateral resolution 410 reduced below a selected threshold.

Figure 5:
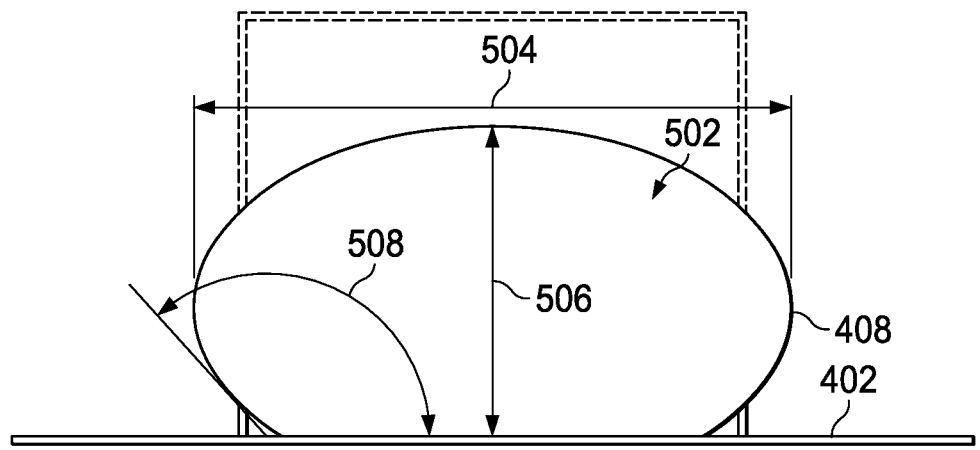
FIG. 5 is an illustration of a cross-sectional view of a drop on a substrate in accordance with an illustrative embodiment.

Turning now to FIG. 5, an illustration of a cross-sectional view of drop 408 on substrate 404 from FIG. 4 is depicted in accordance with an illustrative embodiment. In this illustrative example, a cross-sectional view of drop 408 of plurality of drops 400 deposited on substrate 404 is depicted taken along lines 5-5 in FIG. 4.

As depicted, drop 408 has shape 502, width 504, height 506, and contact angle 508, which may be examples of implementations for shape 142, width 144, height 146, and contact angle 148, respectively, in FIG. 1. In this illustrative example, shape 502 is more rounded than flattened. The reduced flattening of shape 502 may be due to the reduced adhesion between drop 408 and treated surface 402.

In particular, with shape 502 of drop 408 more rounded than flattened, width 504 of drop 408 may be less than two times height 506 of drop 408. In this illustrative example, width 504 may be about 4 micrometers. In other illustrative examples, width 504 may be about 3 micrometers, about 2 micrometers, or about 1 micrometer. Further, contact angle 508 may be greater than about 90 degrees due to the reduced adhesion between drop 408 and treated surface 402.

Figure 6:
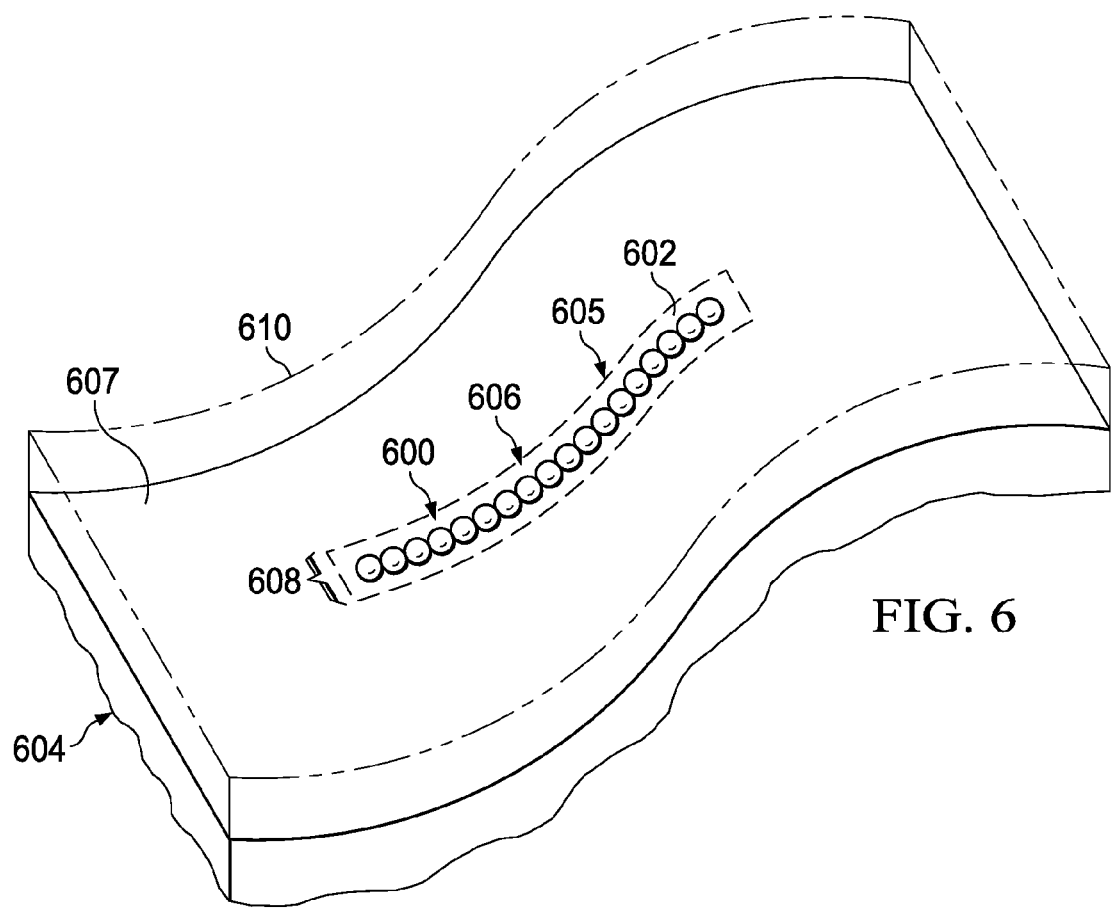
FIG. 6 is an illustration of an isometric view of an optical device formed on a non-planar substrate in accordance with an illustrative embodiment.

Turning now to FIG. 6, an illustration of an isometric view of an optical device formed on a non-planar substrate is depicted in accordance with an illustrative embodiment. In this illustrative example, plurality of drops 600 may be deposited onto treated surface 602 of substrate 604 to form single-mode waveguide 606. Plurality of drops 600, treated surface 602, substrate 604, and single-mode waveguide 606 may be examples of physical implementations for plurality of drops 114, treated surface 116, substrate 104, and optical waveguide 105, respectively, in FIG. 1.

Substrate 604 has surface 607 that is non-planar. In particular, surface 607 may be curved. In this manner, substrate 604 may be considered a non-planar substrate or a curved substrate. Portion 605 of surface 607 of substrate 604 may have been treated using, for example, without limitation, a surface treatment system such as surface treatment system 106 in FIG. 1 to form treated surface 602. Plurality of drops 600 may have been deposited onto treated surface 602 of substrate 604 using, for example, without limitation, an additive manufacturing system such as additive manufacturing system 108 in FIG. 1.

Treated surface 602 may have a number of modified properties, such as number of modified properties 120 in FIG. 1, that cause each of plurality of drops 600 formed on treated surface 602 to have more of a rounded shape than a flattened shape. In particular, portion 605 of surface 607 may have been at least one of mechanically, thermally, or chemically treated to reduce the adhesive forces between plurality of drops 600 and treated surface 602 such that plurality of drops 600 are not flattened more than desired. Single-mode waveguide 606 may have lateral resolution 608.

As depicted, coating 610 may be applied over single-mode waveguide 606 formed by plurality of drops 600 and at least a portion of surface 607 of substrate 604. In particular, coating 610 may be applied over at least a portion of treated surface 602. Coating 610 may be an example of one implementation for coating 155 in FIG. 1.

Coating 610 may be used to secure plurality of drops 600 to substrate 604 such that plurality of drops 600 may be held in substantially fixed positions on treated surface 602 of substrate 604. Coating 610 may ensure that plurality of drops 600 do not move around, or migrate, on treated surface 602 due to the reduced adhesion between plurality of drops 600 and treated surface 602. In some cases, coating 610 may also be used to protect single-mode waveguide 606 formed by plurality of drops 600 from at least one of impact, the atmosphere around single-mode waveguide 606, or some other type of undesired event.

Figure 7:
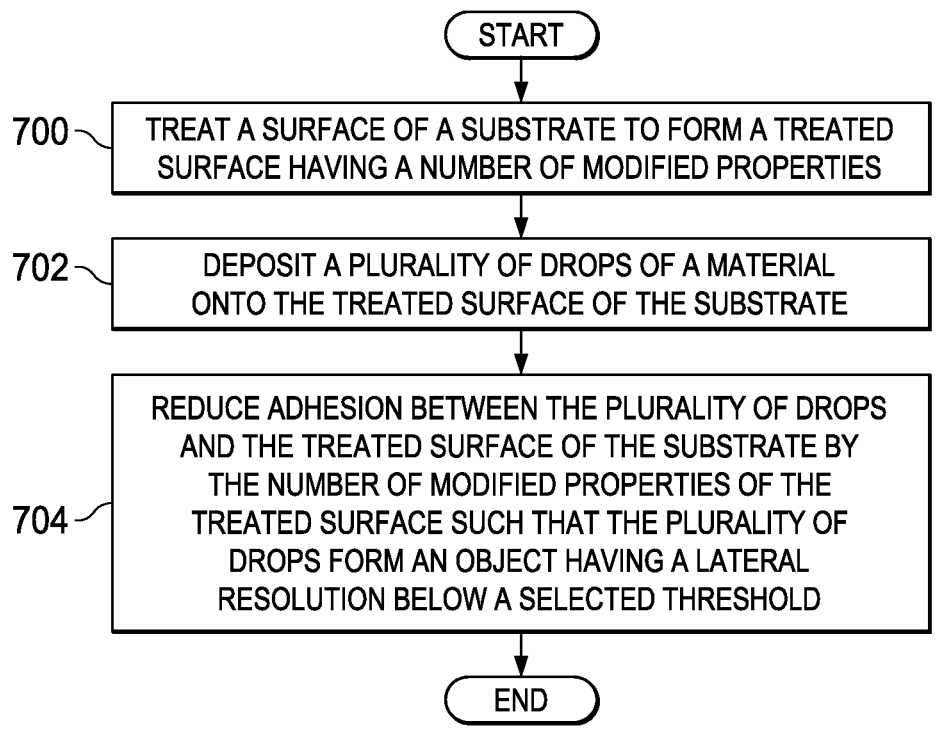
FIG. 7 is an illustration of a process for forming an object on a substrate using additive manufacturing in the form of a flowchart in accordance with an illustrative embodiment.

Turning now to FIG. 7, an illustration of a process for forming an object on a substrate using additive manufacturing is depicted in the form of a flowchart in accordance with an illustrative embodiment. The process illustrated in FIG. 7 may be implemented within manufacturing environment 100 to form object 102 in FIG. 1. For example, the operations of this process may be implemented using additive manufacturing system 108 and surface treatment system 106 in FIG. 1.

The process may begin by treating surface 112 of substrate 104 to form treated surface 116 having number of modified properties 120 (operation 700). Number of modified properties 120 may include at least one of roughened texture 126 or reduced wettability 127. Operation 700 may be performed by at least one of mechanically, thermally, or chemically treating surface 112 of substrate 104. Depending on the implementation, only a portion of or all of surface 112 may be treated. Operation 700 may be performed using surface treatment system 106 in FIG. 1.

Next, plurality of drops 114 of material 110 may be deposited onto treated surface 116 of substrate 104 (operation 702). Operation 702 may be performed using additive manufacturing system 108 in FIG. 1. Adhesion between plurality of drops 114 and treated surface 116 of substrate 104 may be reduced by number of modified properties 120 of treated surface 116 such that plurality of drops 114 form object 102 having lateral resolution 152 below selected threshold 154 (operation 704), with the process terminating thereafter. Selected threshold 154 may be, for example, without limitation, 8 micrometers, 6 micrometers, 5 micrometers, 3 micrometers, or some other resolution below 8 micrometers.

Figure 8:
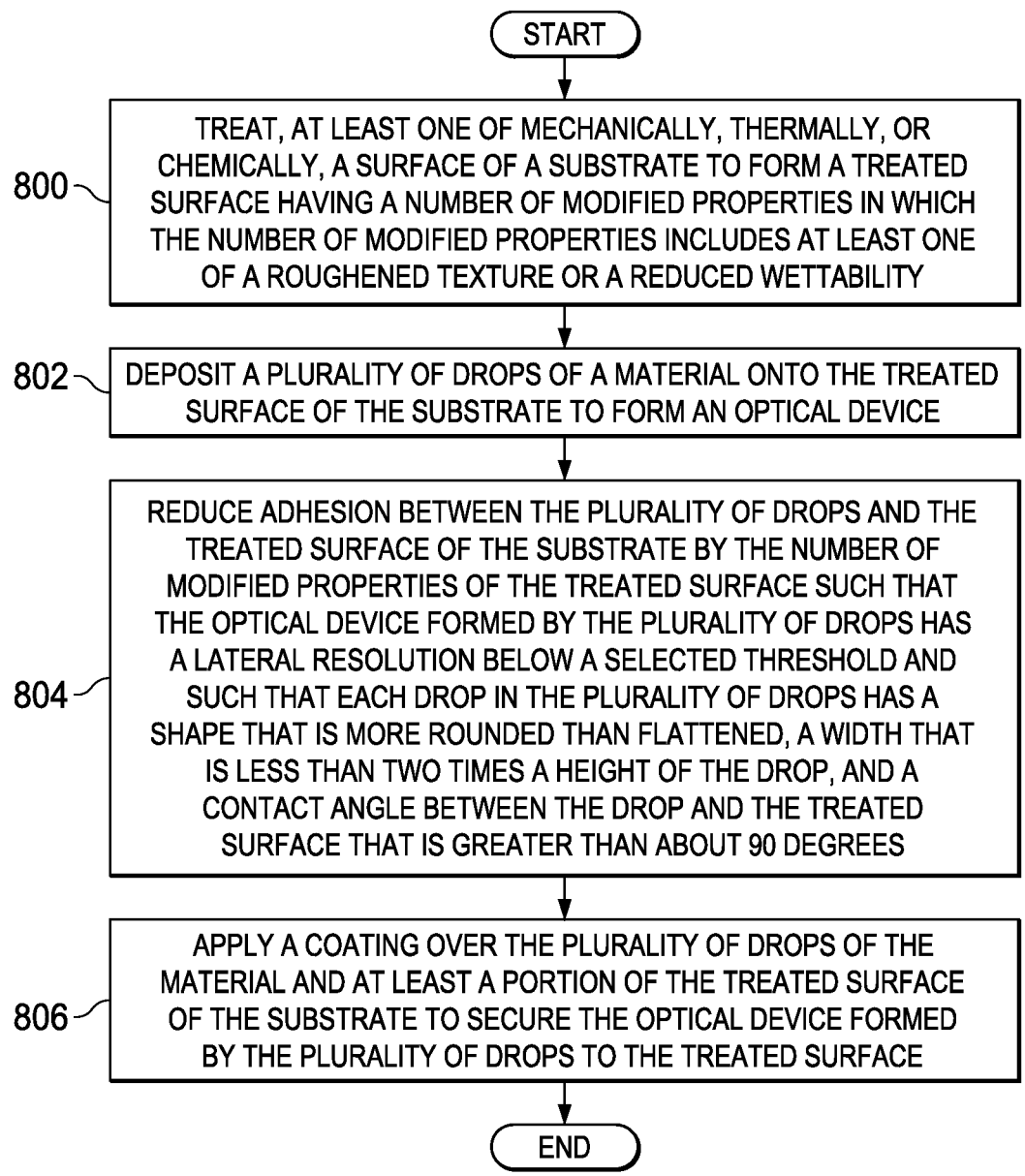
FIG. 8 is an illustration of a process for forming an optical device having a lateral resolution below a selected threshold in the form of a flowchart in accordance with an illustrative embodiment.

Turning now to FIG. 8, an illustration of a process for forming an optical device having a lateral resolution below a selected threshold is depicted in the form of a flowchart in accordance with an illustrative embodiment. The process illustrated in FIG. 8 may be implemented within manufacturing environment 100 to form optical device 103 in FIG. 1. In particular, the operations of this process may be implemented using additive manufacturing system 108 and surface treatment system 106 in FIG. 1.

The process may begin by treating, at least one of mechanically, thermally, or chemically, surface 112 of substrate 104 to form treated surface 116 having number of modified properties 120 in which number of modified properties 120 includes at least one of roughened texture 126 or a reduced wettability 127 (operation 800). Operation 800 may be performed using, for example, without limitation, surface treatment system 106 in FIGS. 1-2. For example, at least one of mechanical treatment system 202, thermal treatment system 204, chemical treatment system 206, or coating applicator 222 may be used to perform operation 800 to form treated surface 116.

Next, plurality of drops 114 of material 110 may be deposited onto treated surface 116 of substrate 104 to form optical device 103 (operation 802). Adhesion 128 between plurality of drops 114 and treated surface 116 of substrate 104 may be reduced by number of modified properties 120 of treated surface 116 such that optical device 103 formed by plurality of drops 114 has lateral resolution 152 below selected threshold 154 and such that each drop 115 in plurality of drops 114 has shape 142 that is more rounded than flattened, width 144 that is less than two times height 146 of drop 115, and contact angle 148 between drop 115 and treated surface 116 that is greater than about 90 degrees (operation 804).

In operation 804, cohesion 129 of the molecules of material 110 may help each of plurality of drops 114 form a more rounded or spherical shape as compared to a flattened shape. Thereafter, coating 155 may be applied over plurality of drops 114 of material 110 and at least a portion of treated surface 116 of substrate 104 to secure optical device 103 formed by plurality of drops 114 to treated surface 116 (operation 806), with the process terminating thereafter.

Figure 9:
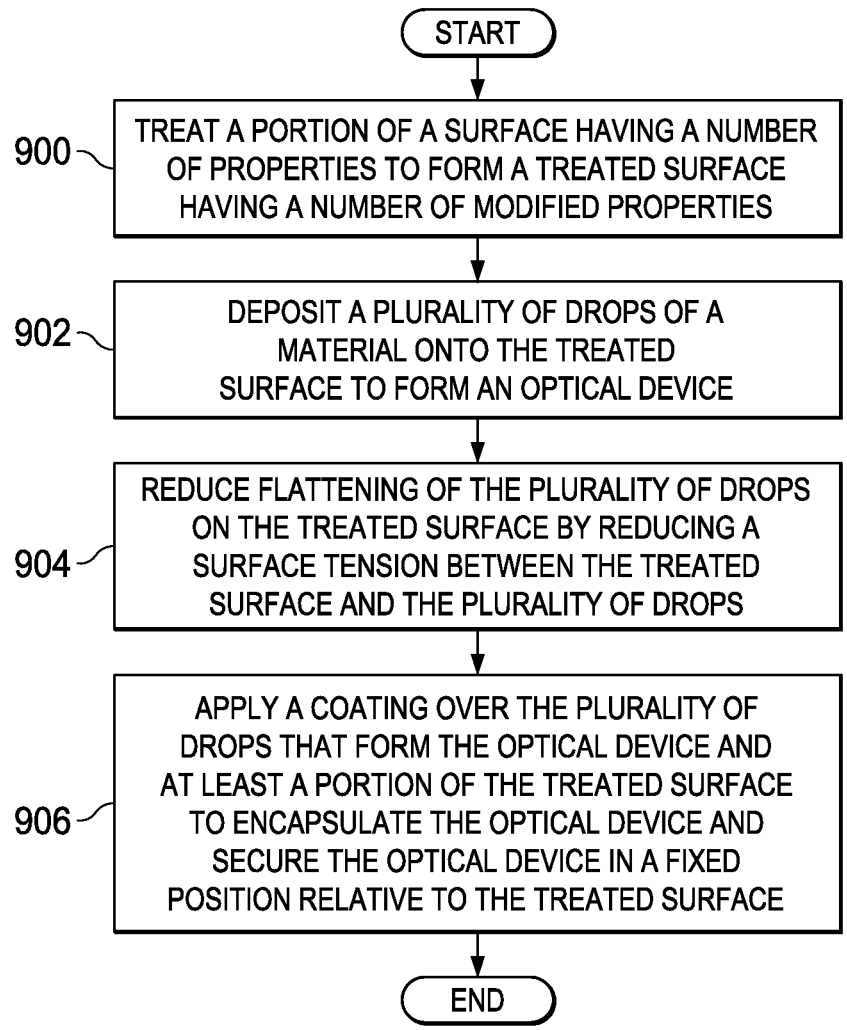
FIG. 9 is an illustration of a process for forming an optical device in the form of a flowchart in accordance with an illustrative embodiment.

With reference now to FIG. 9, an illustration of a process for forming an optical device is depicted in the form of a flowchart in accordance with an illustrative embodiment. The process illustrated in FIG. 9 may be used to form, for example, without limitation, optical device 103 in FIG. 1.

The process may begin by treating portion 113 of surface 112 having number of properties 118 to form treated surface 116 having number of modified properties 120 (operation 900). Next, plurality of drops 114 of material 110 may be deposited onto treated surface 116 to form optical device 103 (operation 902).

Flattening of plurality of drops 114 on treated surface 116 may be reduced by reducing surface tension 125 between treated surface 116 and plurality of drops 114 (operation 904). In operation 904, reducing surface tension 125 causes adhesion 128 between plurality of drops 114 and treated surface 116 to be sufficiently reduced below cohesion 129 of material 110 such that each of plurality of drops 114 has a more rounded, or spherical shape, than a flattened shape.

Next, coating 115 may be applied over plurality of drops 114 that form optical device 103 and at least a portion of treated surface 116 to encapsulate optical device 103 and secure optical device 103 in a fixed position relative to treated surface 116 (operation 906), with the process terminating thereafter. In some illustrative examples, coating 115 may be a layer of paint.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. For example, operation 806 may not occur in all processes.

Illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in the form of a block diagram in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in the form of a block diagram in which an illustrative embodiment may be implemented. In this example, aircraft 1100 is produced by aircraft manufacturing and service method 1000 in FIG. 10 and may include airframe 1102 with a plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. One or more illustrative embodiments may be used during component and subassembly manufacturing 1006. For example, without limitation, object 102 in FIG. 1 may be fabricated during component and subassembly manufacturing 1006. Specifically, object 102 may be formed on substrate 104 to form an aircraft part during component and subassembly manufacturing 1006. Further, object 102 may also be formed on substrate 104 to create replacements during maintenance and service 1014. Substrate 104 may take the form of an aircraft part. For example, without limitation, substrate 104 may take the form of a skin panel or some other type of structure that is part of airframe 1102.

Thus, the illustrative embodiments provide a method and apparatus for forming structures using additive manufacturing on treated surfaces. By treating a substrate to form a treated surface, the treated surface may have a number of desirable properties for depositing material onto the substrate in the form of drops. In particular, the treated surface may have a number of modified properties that cause the flattening of drops deposited onto the treated surface to be reduced sufficiently such that the contact angle between each of the drops and the treated surface is greater than about 90 degrees. In this manner, the object formed by the drops may have a desired lateral resolution. The selected lateral resolution may be, for example, without limitation, a lateral resolution below about 8 micrometers.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming an optical device on a substrate, the method comprising:
   treating a surface of the substrate to form a treated surface having a number of modified properties;
   depositing a plurality of drops of material onto the treated surface of the substrate to form the optical device; and
   reducing an adhesion between the plurality of drops and the treated surface of the substrate by the number of modified properties of the treated surface such that the plurality of drops form the optical device having a lateral resolution below a selected threshold,
   wherein reducing the adhesion between the plurality of drops and the treated surface of the substrate by the number of modified properties of the treated surface comprises:
   reducing the adhesion between a drop in the plurality of drops and the treated surface of the substrate by the number of modified properties of the treated surface such that the drop has a contact angle with the treated surface that is greater than about 90 degrees.

2. The method of claim 1, wherein reducing the adhesion between the plurality of drops and the treated surface of the substrate by the number of modified properties of the treated surface comprises:
   reducing the adhesion between a drop in the plurality of drops and the treated surface of the substrate by the number of modified properties of the treated surface such that the drop has a shape that is more rounded than flattened.

3. The method of claim 1, wherein reducing the adhesion between the plurality of drops and the treated surface of the substrate by the number of modified properties of the treated surface comprises:
   reducing the adhesion between a drop in the plurality of drops and the treated surface of the substrate by the number of modified properties of the treated surface such that the drop has a width that is less than two times a height of the drop.

4. The method of claim 1, wherein reducing the adhesion between the plurality of drops and the treated surface of the substrate by the number of modified properties of the treated surface comprises:
   reducing the adhesion between a drop in the plurality of drops and the treated surface of the substrate by the number of modified properties of the treated surface such that the drop has a width substantially equal to a selected lateral resolution for the optical device.

5. The method of claim 1, wherein treating the surface of the substrate comprises:
   treating the surface of the substrate by at least one of mechanically, thermally, or chemically treating the surface of the substrate to form the treated surface, wherein the substrate is selected to reduce undesired optical signal loss from the optical device formed on the treated surface to surroundings of the optical device and the substrate.

6. The method of claim 1, wherein depositing the plurality of drops of the material onto the treated surface of the substrate comprises:
   depositing the plurality of drops of the material onto the treated surface of the substrate to form the optical device, wherein the optical device is selected from one of an optical waveguide, an optical resonator, and a photonic circuit.

7. The method of claim 1 further comprising:
   applying a coating over the plurality of drops of the material and at least a portion of the treated surface of the substrate to secure the plurality of drops to the treated surface.

8. The method of claim 1, wherein treating the surface of the substrate comprises:
   roughening a texture of the surface of the substrate to form the treated surface having a roughened texture.

9. The method of claim 1, wherein treating the surface of the substrate comprises:
   reducing a wettability of the surface of the substrate to form the treated surface having a reduced wettability such that the adhesion between the plurality of drops and the treated surface is reduced to below a selected adhesion threshold.

10. A method for forming an optical device, the method comprising:
    treating a portion of a surface to form a treated surface;
    depositing a plurality of drops of a material onto the treated surface to form the optical device; and
    reducing flattening of the plurality of drops deposited on the treated surface,
    wherein reducing the flattening of the plurality of drops comprises:
    reducing the adhesion between a drop in the plurality of drops and the treated surface of the substrate by the number of modified properties of the treated surface such that the drop has a contact angle with the treated surface that is greater than about 90 degrees.

11. The method of claim 10, wherein reducing the flattening of the plurality of drops comprises:

reducing a surface tension between the treated surface and the plurality of drops to reduce the flattening of the plurality of drops deposited on the treated surface.

12. The method of claim 10 further comprising:
applying a coating over the optical device and at least a portion of the treated surface to secure the optical device to the treated surface, wherein the coating adheres to the at least a portion of the treated surface to encapsulate the optical device.

13. The method of claim 10, wherein depositing the plurality of drops of the material onto the treated surface comprises:
depositing the plurality of drops of the material onto the treated surface in which the material is selected such that the material has a cohesion that causes the optical device formed on the treated surface to be one of a corrugated optical device and a ribbontype optical device.

14. The method of claim 10, wherein reducing the flattening of the plurality of drops on the treated surface by reducing the surface tension between the treated surface and the plurality of drops comprises:
reducing the flattening of the plurality of drops on the treated surface by reducing the surface tension between the treated surface and the plurality of drops such that the optical device has a desired height and a desired width.

15. The method of claim 10, wherein reducing the flattening of the plurality of drops on the treated surface by reducing the surface tension between the treated surface and the plurality of drops comprises:
reducing the flattening of the plurality of drops on the treated surface by reducing the surface tension between the treated surface and the plurality of drops such that adhesion between the treated surface and the plurality of drops is reduced.

16. The method of claim 15, wherein treating the portion of the surface comprises:
treating the portion of the surface to modify a number of properties of the portion of the surface to form the treated surface having a number of modified properties, wherein the number of modified properties reduce adhesive forces exerted by the treated surface on the plurality of drops to reduce the surface tension between the treated surface and the plurality of drops such that the adhesion between the treated surface and the plurality of drops is reduced.

17. A method for forming an optical device having a lateral resolution below a selected threshold, the method comprising:
treating, at least one of mechanically, thermally, or chemically, a surface of a substrate to form a treated surface having a number of modified properties in which the number of modified properties includes at least one of a roughened texture or a reduced wettability;
depositing a plurality of drops of material onto the treated surface of the substrate to form the optical device;
reducing an adhesion between the plurality of drops and the treated surface of the substrate by the number of modified properties of the treated surface such that the optical device formed by the plurality of drops has the lateral resolution below the selected threshold and such that a drop in the plurality of drops has a shape that is more rounded than flattened, a width that is less than two times a height of the drop, and a contact angle between the drop and the treated surface that is greater than about 90 degrees; and
applying a coating over the plurality of drops of the material and at least a portion of the treated surface of the substrate to secure the optical device formed by the plurality of drops to the treated surface.

18. The method of claim 1, wherein the lateral resolution is a smallest linear separable and measurable feature of the optical device.

19. The method of claim 18, wherein the lateral resolution comprises about 8 micrometers or less.

20. The method of claim 10, wherein reducing flattening of the plurality of drops deposited on the treated surface is used to control a lateral resolution of the optical device to be less than a threshold.

21. The method of claim 20, wherein the lateral resolution comprises about 8 micrometers or less.

22. The method of claim 17, wherein the lateral resolution is a smallest linear separable and measurable feature of the optical device.

23. The method of claim 22, wherein the lateral resolution comprises about 8 micrometers or less.

* * * * *